(12) United States Patent
Alet Vidal et al.

(10) Patent No.: US 9,247,850 B2
(45) Date of Patent: Feb. 2, 2016

(54) COOKING HOB WITH ROTARY BLADE DRIVING MEANS AND ASSEMBLY COMPRISING A COOKING HOB AND COOKING VESSEL WITH ROTARY BLADES

(75) Inventors: Josep Alet Vidal, Oliana (ES); Llluis Trench Roca, Sallent (ES)

(73) Assignee: ELECTRODOMÉSTICOS TAURUS, S.L. (ES)

( * ) Notice: Subject to any disclaimer, the term of this patent is extended or adjusted under 35 U.S.C. 154(b) by 708 days.

(21) Appl. No.: 13/635,394

(22) PCT Filed: Mar. 7, 2011

(86) PCT No.: PCT/ES2011/000062
§ 371 (c)(1),
(2), (4) Date: Sep. 14, 2012

(87) PCT Pub. No.: WO2011/113970
PCT Pub. Date: Sep. 22, 2011

(65) Prior Publication Data
US 2013/0001220 A1     Jan. 3, 2013

(30) Foreign Application Priority Data

Mar. 16, 2010    (ES) .................................. 201000344

(51) Int. Cl.
*H05B 6/12*          (2006.01)
*A21B 7/00*          (2006.01)
(Continued)

(52) U.S. Cl.
CPC .......... *A47J 43/0722* (2013.01); *A47J 43/0465* (2013.01); *B01F 13/0872* (2013.01)

(58) Field of Classification Search
CPC .............. A47J 43/0465; A47J 43/0722; A47J 43/0777; A47J 43/085; B01F 13/0872; B01F 13/0845; B05B 6/02; B05B 6/12
USPC ......... 219/620, 621, 622, 647, 675, 676, 494, 219/506, 445.1, 497, 429, 430, 433, 458, 219/448.12, 448.11; 99/357, 348, 326, 331, 99/334; 366/273, 274, 285, 136, 146
See application file for complete search history.

(56) References Cited

U.S. PATENT DOCUMENTS 3,790,346 A * 2/1974 Ritchie ........................... 422/64
4,467,162 A     8/1984 Kondo et al.
(Continued)

FOREIGN PATENT DOCUMENTS

DE    102007013138 A1    10/2007
EP         2133139 A1    12/2009
(Continued)

*Primary Examiner* — Hung D Nguyen
(74) *Attorney, Agent, or Firm* — Hess Patent Law Firm LLC; Robert J. Hess

(57) ABSTRACT

The cooking hob (1) has a support plate (2) made of glass or glass ceramic, a lower magnetic coupling member (5) rotatably arranged below the support plate (2), a drive motor (6) operatively connected for rotating the lower magnetic coupling member (5), and position changing means (33) for moving the lower magnetic coupling member (5) between an operative position, in which the lower magnetic coupling member (5) is close to the support plate (2) and magnetically transmits torque to an upper magnetic coupling member (54) connected to rotary blades (53) installed in a cooking vessel (50) located on the support plate (2), and an inoperative position, in which the lower magnetic coupling member (5) is far enough from the support plate (2) for not magnetically transmitting the torque.

17 Claims, 6 Drawing Sheets

(51) Int. Cl.
*B01F 13/08* (2006.01)
*A47J 43/07* (2006.01)
*A47J 43/046* (2006.01)

(56) References Cited

U.S. PATENT DOCUMENTS

| | | | |
|---|---|---|---|
| 4,476,946 A | * | 10/1984 | Smith ............................ 177/144 |
| 4,725,149 A | * | 2/1988 | Kawakami et al. ............ 366/273 |
| 5,364,184 A | * | 11/1994 | Rains ............................. 366/273 |
| 7,018,091 B2 | * | 3/2006 | Arroubi et al. ................ 366/199 |
| 2005/0183582 A1 | * | 8/2005 | McFadden et al. ............. 99/348 |
| 2008/0047954 A1 | | 2/2008 | McFadden et al. |
| 2009/0194526 A1 | * | 8/2009 | Buchanan ..................... 219/600 |

FOREIGN PATENT DOCUMENTS

| | | |
|---|---|---|
| JP | 2004-55507 A * | 2/2004 |
| WO | 9305345 A1 | 3/1993 |

* cited by examiner

COOKING HOB WITH ROTARY BLADE DRIVING MEANS AND ASSEMBLY COMPRISING A COOKING HOB AND COOKING VESSEL WITH ROTARY BLADES

FIELD OF THE ART

The present invention relates to a cooking hob provided with a continuous glass or glass ceramic support plate and suitable for operating with a cooking vessel provided with rotary blades, therefore the cooking hob has driving means for driving the rotary blades of the cooking vessel through the support plate. The present invention also relates to an assembly comprising a cooking hob with rotary blade driving means and a cooking vessel with rotary blades.

BACKGROUND OF THE INVENTION

U.S. Pat. No. 5,549,382 describes a cooking hob provided with a support plate for supporting several cooking vessels. The support plate has several cooking areas and the cooking hob includes heating means for each cooking area and driving means aligned with one of the cooking areas. The driving means comprise a lower magnetic coupling member driven to rotate below the support plate in a position close enough to it to magnetically transmit torque to an upper magnetic coupling member attached to a stirrer located inside a cooking vessel placed in the corresponding cooking area. In one embodiment, the lower and upper magnetic coupling members include permanent magnets.

This magnetic coupling arrangement has several drawbacks. Firstly, when the user moves the vessel closer to the cooking hob, the vessel, containing the upper magnetic coupling member, is strongly attracted by the lower magnetic coupling member of the cooking hob, and this can cause the vessel to collide against the cooking hob with the risk of breaking the support plate. Secondly, the attractive force of the two lower and upper magnetic coupling members also makes removing the vessel from the cooking area of the cooking hob difficult to a large extent. Thirdly, when there is no vessel in the cooking area of the cooking hob, different kitchen utensils of a ferromagnetic nature can be involuntarily attracted towards the cooking area due to the magnetic field generated by the permanent magnets of the lower magnetic coupling member.

DISCLOSURE OF THE INVENTION

According to a first aspect, the present invention contributes to mitigating the aforementioned and other drawbacks providing a cooking hob with rotary blade driving means for driving rotary blades installed inside a cooking vessel, where the cooking hob comprises a continuous glass or glass ceramic support plate provided with a treatment area, and where said rotary blade driving means comprise a lower magnetic coupling member rotatably arranged in said treatment area below the support plate and a drive motor operatively connected for rotating said lower magnetic coupling member. The cooking hob of the present invention is characterized in that it includes activation/deactivation means for substantially activating and deactivating the magnetic field exerted by the lower magnetic coupling member through the support plate.

In one embodiment, said activation/deactivation means comprise position changing means for moving the lower magnetic coupling member between an operative position, in which the lower magnetic coupling member is close enough to the support plate to magnetically transmit torque to an upper magnetic coupling member connected to said rotary blades installed in a cooking vessel located on the treatment area of the support plate, and an inoperative position, in which the lower magnetic coupling member is far enough from the support plate so as to not transmit said torque.

With this arrangement, when the lower magnetic coupling member is in the mentioned inoperative position far from the support plate, the attractive force between the lower and upper magnetic coupling members is very weak and the cooking vessel can be placed in and removed from the treatment area of the support plate virtually without the need for any additional force, with the same ease with which a vessel would be placed on or removed from a cooking hob without magnetic coupling. Furthermore, when the lower magnetic coupling member is in the mentioned inoperative position far from the support plate, the magnetic field in the treatment area is so weak that it does not substantially attract other kitchen utensils susceptible to being magnetically attracted.

An example of the position changing means comprises a position changing motor operatively connected for moving a moving support with respect to a base structure supporting the support plate, and the lower magnetic coupling member together with said drive motor and mechanical transmission means for transmitting movement from the drive motor to the lower magnetic coupling member are installed on said moving support. The base structure can be fixed to a board, a surface plate, a piece of furniture, etc.

In another alternative embodiment, the activation/deactivation means comprise shielding means for moving one or more shield elements between an inactive position, in which said one or more shield elements are separated from the lower magnetic coupling member to allow it to magnetically transmit torque to the upper magnetic coupling member connected to the rotary blades installed in the cooking vessel located on the treatment area of the support plate, and an active position, in which the one or more shield elements is arranged between the support plate and the lower magnetic coupling member to prevent transmitting said torque.

For example, the support plate and the lower magnetic coupling member can be supported on a base structure, and said shielding means can comprise a shielding motor operatively connected for moving the one or more shield elements parallel to the support plate inside and outside a space between the support plate and the lower magnetic coupling member.

The one or more shield elements are made of a ferromagnetic material with a high magnetic permeability, for example soft iron. Therefore, when the one or more shield elements are in the active position, the lines of magnetic force generated by the lower magnetic coupling member are closed through the one or more shield elements and substantially do not pass through the support plate, such that the attractive effect they produce in the upper side of the support plate has a null or very weak effect with respect to the vessel or other kitchen utensils. When the one or more shield elements are in the inactive position, the lines of magnetic force generated by the lower magnetic coupling member pass through the support plate and carry out the magnetic coupling with the upper magnetic coupling member of the cooking vessel placed on the treatment area of the cooking hob.

In one embodiment, the support plate is supported on the base structure by weighing means including a weight transducer in connection with an electronic control circuit, which in turn is in connection with a control panel for controlling different functions of the cooking hob, such as the operation of the rotary blade driving means and the activation/deactivation means.

The cooking hob of the present invention preferably though not necessarily comprises heating means located in relation to the treatment area below said support plate. These heating means preferably use electric power supplied through a cable connected to the mains, and the electronic control circuit in connection with the control panel is used to also control the heating means. In a preferred embodiment, the heating means comprise an induction heating device arranged around the lower magnetic coupling member at a short distance from the support plate and an electronic induction circuit for powering up said induction heating device.

The electronic control circuit optionally includes a signal receiver configured and arranged for receiving a signal sent from a signal emitter installed in said cooking vessel, and the electronic control circuit is suitable for enabling or disabling the operation of the rotary blade driving means and/or of the position changing means and/or of the heating means according to said signal received from said signal emitter.

According to a second aspect, the present invention provides an assembly comprising a cooking hob with rotary blade driving means and a cooking vessel with rotary blades, where said cooking hob comprises a continuous glass or glass ceramic support plate provided with a treatment area, and rotary blade driving means comprising a lower magnetic coupling member rotatably arranged in said treatment area below the support plate and a drive motor operatively connected for rotating said lower magnetic coupling member, and where said cooking vessel comprises a vessel wall with a bottom and an upper opening, a lid for closing said upper opening, rotary blades installed inside said vessel wall, and an upper magnetic coupling member connected to said rotary blades and arranged for facing and being located a short distance from an upper surface of said support plate when said cooking vessel is located thereon. The assembly of the present invention is characterized in that it comprises activation/deactivation means for substantially activating and deactivating the magnetic field exerted by the lower magnetic coupling member through the support plate, as described above.

The cooking vessel forming part of the assembly comprises an electronic circuit in connection with a lid position detector configured and arranged for detecting if said lid is in a correct closed position. The mentioned electronic circuit includes a signal emitter configured for wirelessly emitting a signal representative of said lid position detection, said signal being suitable for being received by a signal receiver located below the support plate.

The cooking vessel optionally further comprises a temperature detector configured and arranged for detecting a temperature in the vessel. This temperature detector is also in connection with the electronic circuit, and said signal emitter is configured for wirelessly emitting a signal representative of said temperature detection, said signal being suitable for being received by a signal receiver located below the support plate.

The cooking hob comprises a control panel connected to an electronic control circuit for controlling said rotary blade driving means and/or said position changing means and/or said heating means. This electronic control circuit includes the mentioned signal receiver, which is configured and arranged for receiving said signals sent from the signal emitter installed in the cooking vessel when it is placed on the treatment area of the support plate. The electronic control circuit is configured for enabling or disabling the operation of said rotary blade driving means and/or of said position changing means and/or of said heating means according to said signal received from said signal emitter.

In one embodiment, the cooking vessel comprises a photovoltaic cell exposed to light and connected for charging an energy storage device configured and arranged for supplying electric current to said electronic circuit and to said detectors. In another embodiment, the cooking hob comprises an energy emitter installed below the support plate, and the cooking vessel comprises an energy receiver configured and arranged for receiving energy wirelessly emitted by said energy emitter, for converting said energy received into electric current, and for supplying said electric current to said electronic circuit and to said detectors.

The cooking vessel preferably comprises a support element located at a lower level than said bottom of the vessel wall for resting on the support plate. This support element has a coefficient of friction with respect to the support plate low enough to allow sliding and self-centering of the cooking vessel in the treatment area due to the effect of said torque transmitted by the lower magnetic coupling member of the cooking hob to said upper magnetic coupling member of the vessel and high enough to prevent the cooking vessel from rotating around due to the effect of the torque in the event that the blades are locked, said support element being made of a soft enough material so as to not scratch the support plate. Nevertheless, this support element is not essential for the purpose of the present invention, and the bottom of the cooking vessel could be supported directly on the support plate.

BRIEF DESCRIPTION OF THE DRAWINGS

The foregoing and other advantages and features will be better understood from the following detailed description of several embodiments in reference to the attached drawings, in which.

DETAILED DESCRIPTION OF SEVERAL EMBODIMENTS

Figure 1:
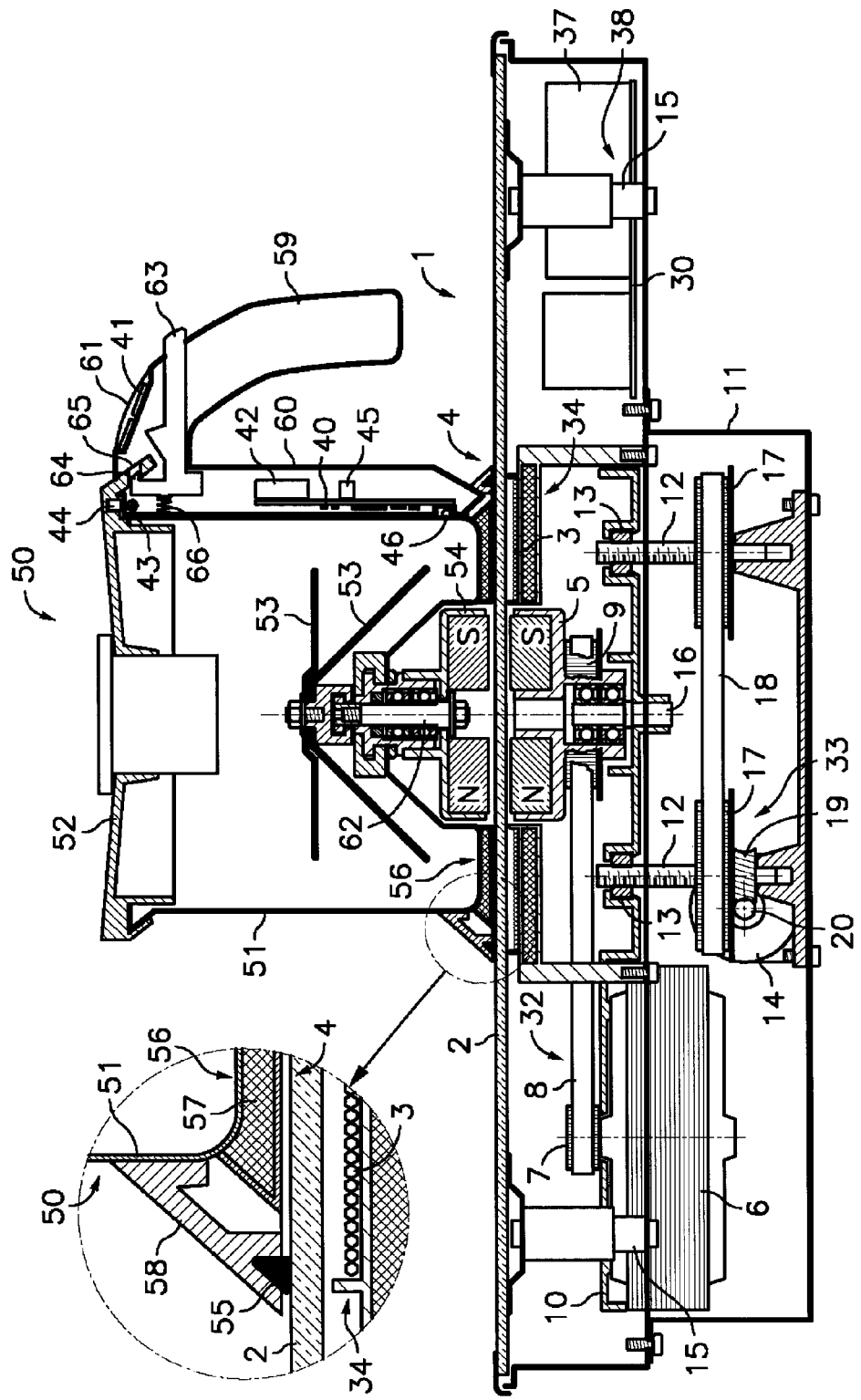
FIG. 1 is a schematic elevational cross-section view of a cooking hob with rotary blade driving means in an operative position, and a cooking vessel with rotary blades placed on the cooking hob, according to a first embodiment of the present invention, with an enlarged detail.
Figure 2:
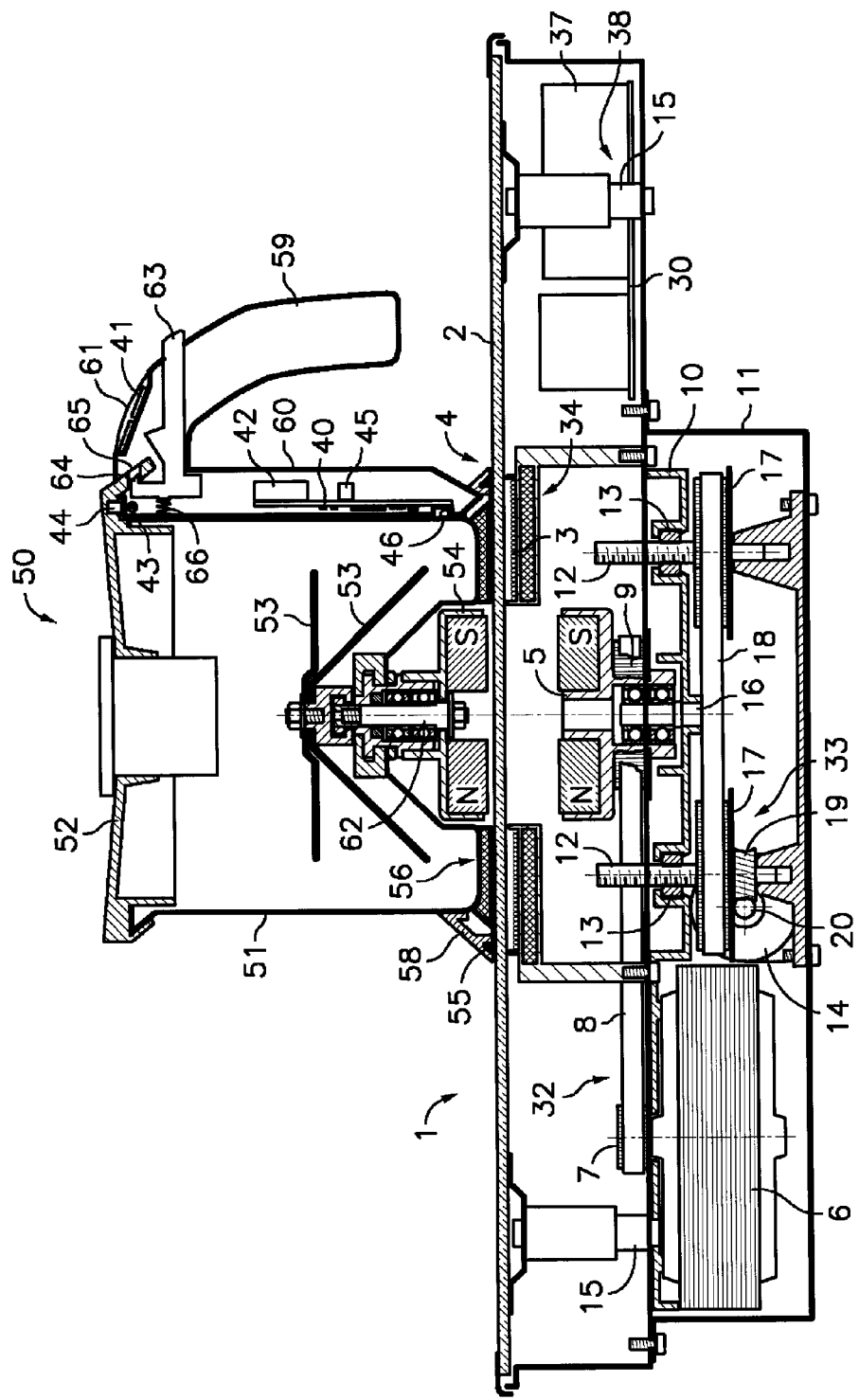
FIG. 2 is a schematic elevational cross-section view of the cooking hob of FIG. 1 with said rotary blade driving means in an inoperative position, and the cooking vessel with rotary blades placed on the cooking hob.
Figure 4:
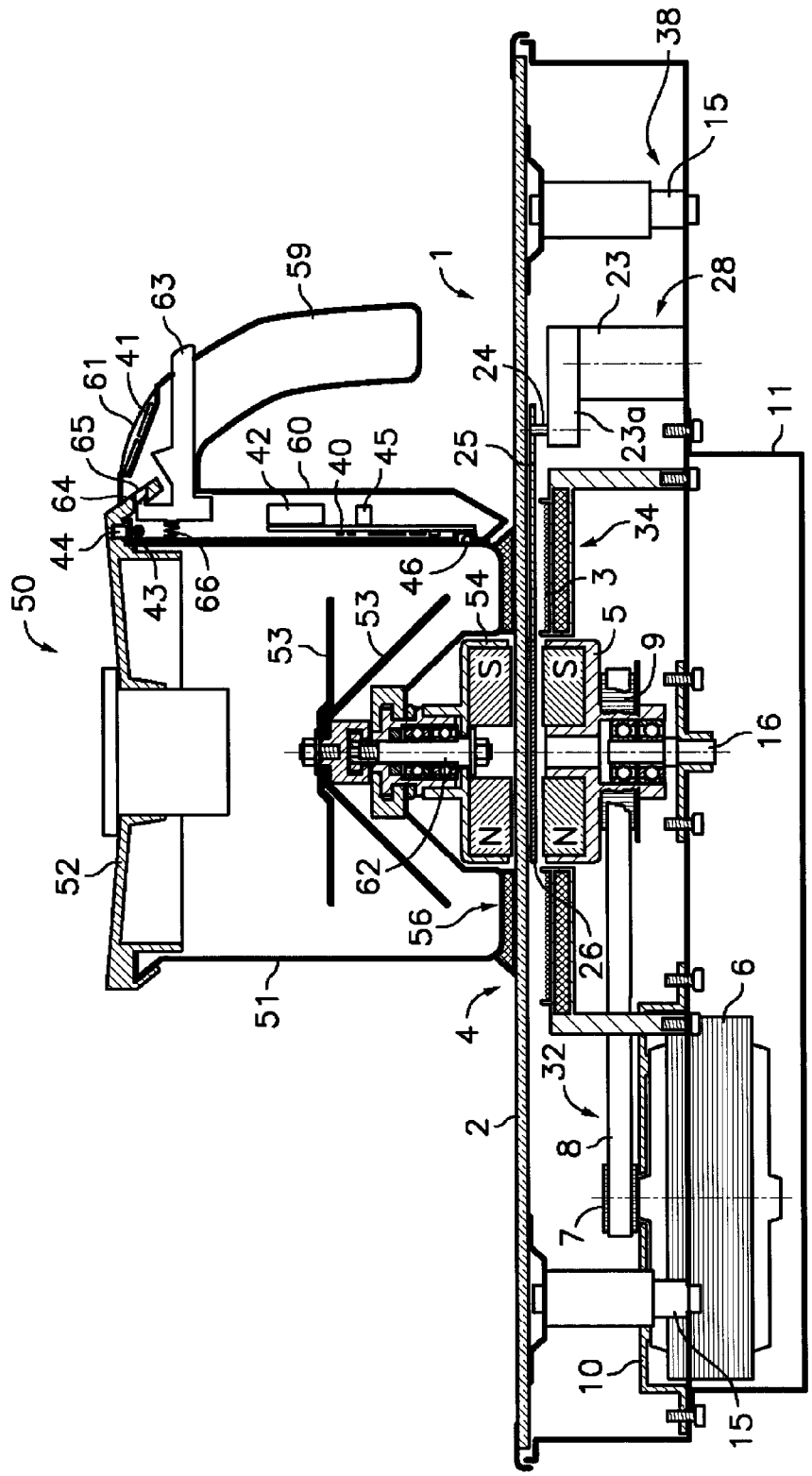
FIG. 4 is a schematic elevational cross-section view of the cooking hob of FIG. 3 with said rotary blade driving means in an inoperative situation, and the cooking vessel with rotary blades placed on the cooking hob.

Firstly, FIGS. 1 and 2 show a cooking hob 1 according to a first embodiment of the present invention, which comprises a base structure 11 supporting a continuous glass or glass ceramic support plate 2 which is provided with a treatment area 4 generally visually indicated on an upper surface of the support plate 2, as shown in FIG. 4. FIGS. 1 and 2 likewise show a cooking vessel 50 arranged on the mentioned treatment area 4 of the support plate. The cooking vessel 50 has rotary blades 53 arranged inside it and the cooking hob 1 comprises rotary blade driving means 32 capable of rotating the rotary blades 53 of the cooking vessel 50 by means of magnetic coupling through the support plate 2.

The cooking hob 1 alone forms the object of the first aspect of the present invention, and the assembly comprising the cooking hob 1 and the cooking vessel 50 form the object of the second aspect of the present invention.

The mentioned rotary blade driving means 32 provided in the cooking hob 1 comprise a lower magnetic coupling member 5 arranged for rotating about a vertical shaft 16 centrally arranged with respect to the treatment area 4 below the support plate 2, and a drive motor 6 operatively connected for rotating said lower magnetic coupling member 5.

The cooking vessel 50 comprises a vessel wall 51 with a bottom 56 and an upper opening, a lid 52 for closing said upper opening, a handle 59 fixed to said vessel wall 51, and rotary blades 53 installed inside the vessel wall 51. The rotary blades 53 are supported for rotating with respect to a vertical shaft 62, which passes through an opening in said bottom 56 and connects with an upper magnetic coupling member 54 arranged in an open-bottom concavity formed at the bottom 56. When the cooking vessel 50 is placed on the support plate 2, the mentioned upper magnetic coupling member 54 is facing and located a short distance from an upper surface of the support plate 2, without coming into contact with it.

The lower and upper magnetic coupling members 5, 54 preferably comprise respective permanent magnets arranged with their N, S poles on opposite sides of their respective rotation shafts 16, 62.

The cooking hob 1 includes activation/deactivation means for activating/deactivating the magnetic coupling, comprising position changing means 33 for moving the lower magnetic coupling member 5 between an operative position (FIG. 1), in which the lower magnetic coupling member 5 is close enough to the support plate 2 to magnetically transmit torque to the upper magnetic coupling member 54 connected to the rotary blades 53 installed in the cooking vessel 50 located on the treatment area 4 of the support plate 2, and an inoperative position (FIG. 2), in which the lower magnetic coupling member 5 is far enough from the support plate 2 so as to not transmit said torque.

In the illustrated embodiment, a moving support 10, which can be moved vertically with respect to the base structure 11 by said position changing means 33, is arranged inside the base structure 11. The vertical shaft 16 with respect to which the lower magnetic coupling member 5 rotates is rotatably supported on the moving support 10. The lower magnetic coupling member 5 has a cog pulley 9 fixed to it, which pulley is kinetically connected by means of a cog belt 8 with a cog pulley 7 fixed to the output shaft of a drive motor 6 likewise supported on the moving support 10. The activation of the drive motor 6 rotates the lower magnetic coupling member 5 with respect to the vertical shaft 16.

The position changing means 33 comprise spindles 12 rotatably supported on the base structure 11. The mentioned spindles 12 are coupled to corresponding nuts 13 fixed in housings formed in the moving support 10. Each of the spindles 12 has a cog pulley 17 fixed to it. A cog belt 18 is installed on said cog pulleys 17 forcing the spindles 12 to rotate in unison. One of the spindles 12 further has a gear wheel 19 fixed to it, which wheel meshes with a worm screw 20 fixed to the output shaft of a position changing motor 14 supported on the base structure 11.

An activation of the position changing motor 14 for rotating in a first direction rotates the spindles 12 in a first direction, and this causes an upward vertical movement of the moving support 10 from the inoperative position shown in FIG. 2 to the operative position shown in FIG. 1, in which the lower magnetic coupling member 5 can rotate with respect to the vertical shaft 16 in a position very close to a lower surface of the support plate 2 without coming into contact with it, and can magnetically transmit torque provided by the drive motor 6 to the upper magnetic coupling member 54 connected to the rotary blades 54 inside the cooking vessel 50 arranged on the treatment area 4 of the support plate 2.

Inversely, activation of the position changing motor 14 for rotating in a second opposite direction causes a downward vertical movement of the moving support 10 from the operative position shown in FIG. 1 to the inoperative position shown in FIG. 2, in which the lower magnetic coupling member 5 is so far from the support plate 2 that it cannot magnetically transmit the torque to the upper magnetic coupling member 54 of the cooking vessel 50 even though the lower magnetic coupling member 5 is rotating with respect to the vertical shaft 16 and the cooking vessel 50 is arranged on the treatment area 4 of the support plate 2.

As shown in the enlarged detail of FIG. 1, the cooking vessel 50 preferably comprises a support element 55 located at a lower level than said bottom 56 of the vessel wall 51 for resting on the support plate 2 such that the bottom 56 of the cooking vessel 50 is very close to the upper surface of the support plate 2 without coming into contact with it. In the illustrated embodiment, the mentioned support element 55 is in the form of a perimetral ring housed in a support skirt 58 fixed to the vessel wall 51, although it could alternatively be in another form. For example, the support element 55 could be in the form of three or more individual support chocks, or the cooking vessel 50 could have three or more individual legs, each finished with a support element 55.

In any case, the support element 55 is made of a material which has a coefficient of friction with respect to the support plate 2 low enough to allow sliding and self-centering of the cooking vessel 50 in said treatment area 4 due to the effect of said torque transmitted by the lower magnetic coupling member 5 of the cooking hob 1 to said upper magnetic coupling member 54, and high enough to prevent the cooking vessel 50 from rotating around due to the effect of the mentioned torque, for example in the event that the rotary blades 32 are locked. Furthermore, the material of the support element 55 is soft enough so as to not scratch the support plate 2. Therefore, the cooking vessel 50 can be placed approximately on the treatment area 4 of the support plate 2 without needing to center it perfectly since the cooking vessel 50 will center itself when the rotary blade driving means 32 of the cooking hob 1 start operating without scratching the support plate 2.

A pushbutton 63 movable between a locking position, in which a protrusion 64 formed in the pushbutton 63 is introduced in a hole 65 formed in an appendage of the lid 52 for locking the lid 52 in the closed position (FIGS. 1 and 2), and a release position, in which the protrusion 64 is outside the hole 65 allowing the lid 52 to be opened, is installed in the handle 59 of the cooking vessel 50. An elastic element 66, such as a spring, pushes the pushbutton 63 towards said locking position, and the pushbutton 63 can be moved manually towards the release position against the elastic force of the elastic element 66.

Figure 3:
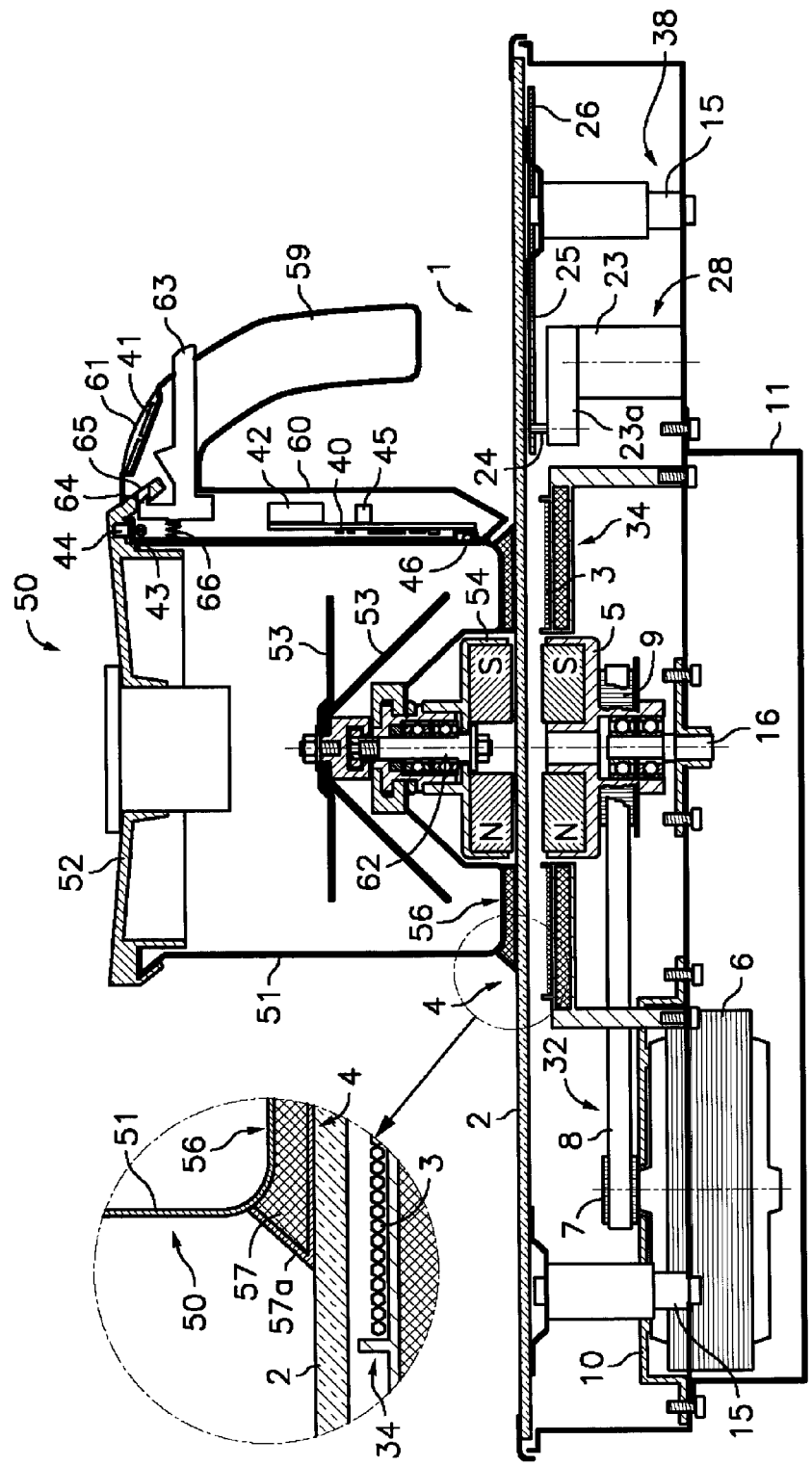
FIG. 3 is a schematic elevational cross-section view of a cooking hob with rotary blade driving means in an operative situation, and a cooking vessel with rotary blades placed on the cooking hob, according to a second embodiment of the present invention, with an enlarged detail.

A cooking hob 1 and an assembly comprising a cooking hob 1 and a cooking vessel 50 according to a second embodiment of the present invention will now be described in relation to FIGS. 3 and 4.

The cooking hob 1 of this second embodiment differs from that of the first embodiment only in that the activation/deactivation means for activating/deactivating the magnetic coupling here comprise shielding means 28 instead of the position changing means 33. In FIGS. 3 and 4, the support plate 2 and the lower magnetic coupling member 5 are supported on a base structure 11 such that there is a small space between both. The mentioned shielding means 28 comprise a shielding motor 23 coupled to a reducer 23a which has an output shaft 24 connected to a shield element 26 by means of an arm 25.

The mentioned shield element 26 and the arm 25 have a flat enough shape to be able to be moved parallel to the support plate 2 inside and outside said space between the support plate 2 and the lower magnetic coupling member 5. The shield element 26 has a circular shape with a diameter suitable for covering the lower magnetic coupling member 5 and is made of a material with high magnetic permeability, such as soft iron. If, as in the example illustrated in the FIGS. 3 and 4, an induction heating device 3 is arranged around the lower magnetic coupling member 5, the arm 25 is made of a diamagnetic material, such as copper, so as to not interfere with the operation of the induction heating device 3.

The shielding motor 23 can thus be activated for moving the shield element 26 between an inactive position (FIG. 3), in which the shield element 26 is separated from the lower magnetic coupling member 5 to allow it to magnetically transmit torque to the upper magnetic coupling member 54 connected to the rotary blades 53 installed in the cooking vessel 50 located on the treatment area 4 of the support plate 2, and an active position (FIG. 4), in which the shield element 26 is arranged between the support plate 2 and the lower magnetic coupling member 5 to prevent transmitting the torque.

The cooking vessel 50 of the second embodiment differs from that of the first embodiment only in that it does not have the support element 55. Consequently, when the cooking vessel 50 is placed on the treatment area 4 of the support plate 2, the bottom 56 of the cooking vessel 50 is supported directly on the support plate 2, or more specifically, a layer of coating 57a coating a ferromagnetic layer 57 of the bottom 56 of the cooking vessel 50 is supported directly on the support plate 2. The mentioned ferromagnetic layer 57 is suitable for being heated by the induction heating device 3.

It will be understood that the cooking vessels 50 of the first and second embodiments are interchangeable, and both can equally operate with any of the cooking hobs 1 of the first and second embodiments.

Figure 5:
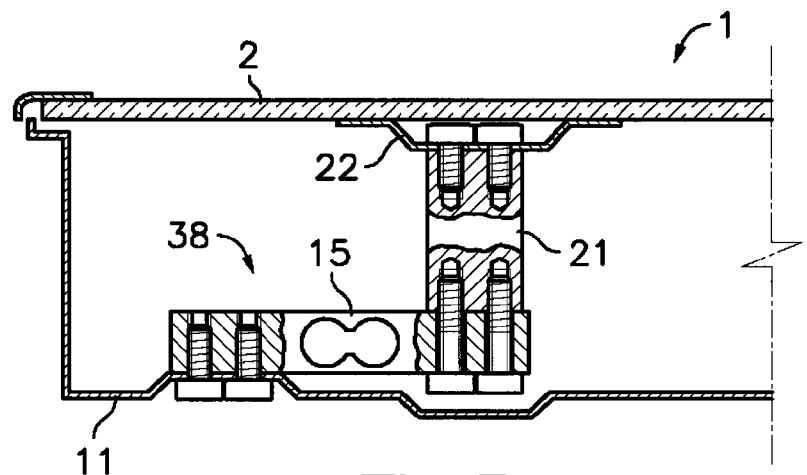
FIG. 5 is a schematic side elevational cross-section view of part of the cooking hob showing weighing means according to one embodiment.

In both first and second embodiments, the support plate 2 of the cooking hob 1 is supported on the base structure 11 by weighing means 38 better shown in FIG. 5. The weighing means 38 preferably include one or more weight transducers, each formed by a deformable support 15 and a strain gage (not shown) associated therewith. The mentioned deformable support 15 has a horizontally elongated shape and is fixed at one end to the base structure 11 and at the other end to a column 21, which in turn is fixed to a support 22 supporting the support plate 2. The deformable part 15 deforms slightly according to the weight loaded on the support plate 2 and the strain gage emits a signal proportional to the deformation experienced by the deformable support 15.

The weight transducers are in connection with the electronic control circuit 10 of the cooking hob 1 for weighing, for example, the cooking vessel 50 placed on the support plate 2. Given that the tare of the cooking vessel 50 is known, the electronic control circuit 10 can directly provide the weight of the foods contained in the cooking vessel 50.

Figure 6:
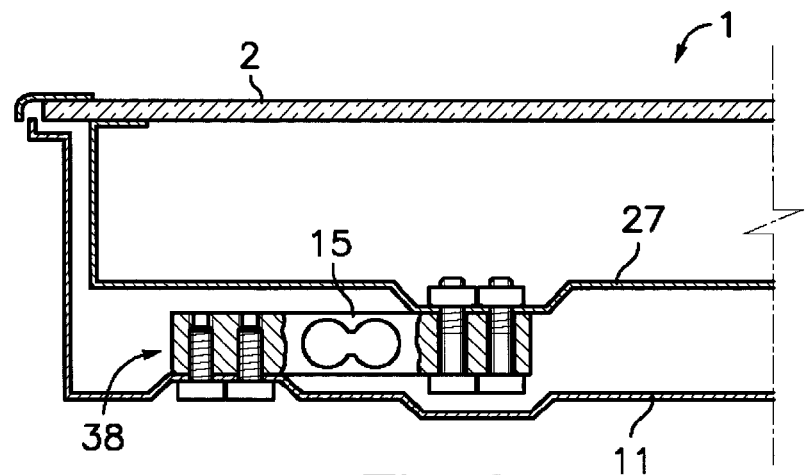
FIG. 6 is a schematic side elevational cross-section view of part of the cooking hob showing weighing means according to another embodiment.

FIG. 6 shows weighing means 38 according to another alternative embodiment, where the support plate 2 is fixed to an intermediate support 27 on which the lower magnetic coupling member 5 (not shown in FIG. 6) is supported, and where said intermediate support 27 is supported on the base structure 11 by the weighing means 38, which preferably include one or more weight transducers. Each weight transducer is formed by a deformable support 15 and a strain gage (not shown) associated therewith, where the support deformable 15 has one end fixed to the base structure 11 and another end fixed to the intermediate support 27. Therefore, the magnetic attractive force between the lower and upper magnetic coupling members 5, 54 does not alter the operation of the weighing means 38.

The cooking hob 1 of both first and second embodiments preferably comprises heating means 34 located in relation to said treatment area 4 below said support plate 2. In the illustrated embodiments, said heating means 34 comprise an induction heating device 3 in the form of a planar ring arranged around the lower magnetic coupling member 5 in a position adjacent to the support plate 2 but without coming into contact with it. An electronic induction circuit 36 supplied by an electrical connection to the mains 37 is arranged for powering up said induction heating device 3. The bottom 56 of the cooking vessel 50 comprises a planar portion around the upper magnetic coupling member 54 with a ferromagnetic layer 57 suitable for being heated by the induction heating device 3.

Figure 7:
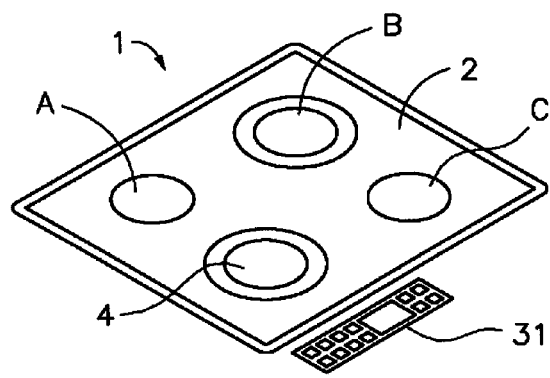
FIG. 7 is a schematic perspective view of the cooking hob according to another embodiment of the present invention.

FIG. 7 shows an alternative embodiment of the cooking hob 1 of the present invention, where the support plate 2 comprises several treatment areas 4, A, B, C. All the treatment areas 4, A, B, C are associated with corresponding heating means, which can be induction or radiation heating means, but only the treatment area 4 is further associated with rotary blade driving means 32 and position changing means 33 similar to those described above in relation to FIGS. 1 and 2 or shielding means 28 similar to those described above in relation to FIGS. 3 and 4. The cooking hob 1 further comprises a control panel 31 available to a user, which is connected to an electronic supply and control circuit 30 for controlling the rotary blade driving means 32, the position changing means 33 or shielding means 28, and the heating means 34 associated with the treatment area 4, as well as the heating means associated with the remaining treatment areas A, B, C. In the embodiment shown in FIG. 4, the control panel 31 is independent of the support plate 2, although it could alternatively be integrated in the support plate 2 in the form of a touch screen.

Figure 8:
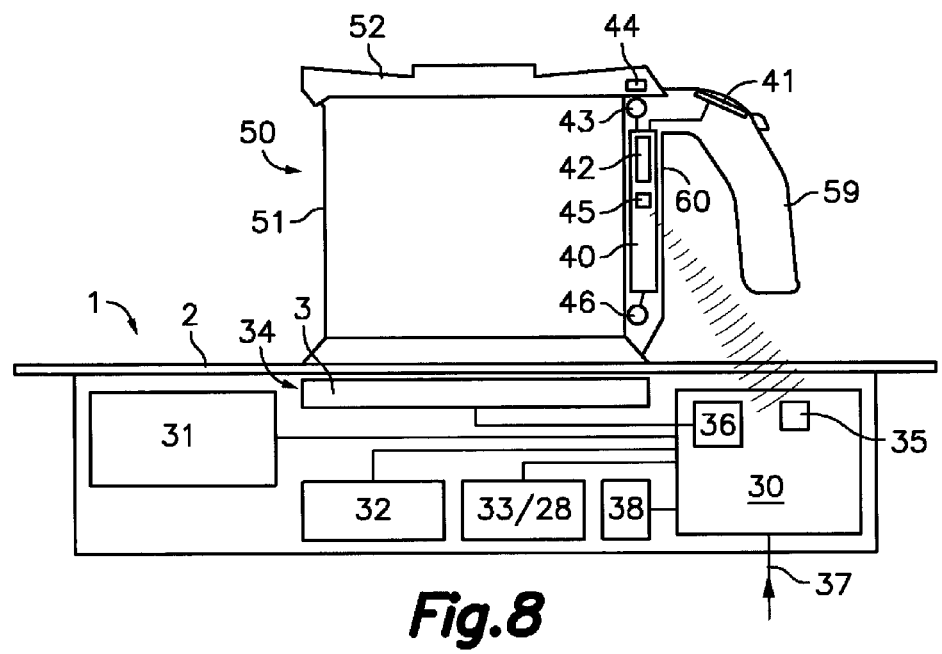
FIG. 8 is a schematic depiction of control means of the cooking hob according to an embodiment of the present invention.

Electrical supply and control means of the assembly formed by the cooking hob 1 and the cooking vessel 50 of the present invention are now described in reference to FIG. 8. The cooking hob 1 comprises, below the support plate 2, an electronic supply and control circuit 30, which is in connection with the control panel 31, the rotary blade driving means 32, the position changing means 33 or shielding means 28, the weighing means 38, and with an electronic induction circuit 36 which in turn is in connection with the induction heating device 3 of the heating means 34. All the electric and electronic systems of the cooking hob 1 are supplied by a connection to the mains 37.

The cooking vessel 50 comprises an electronic circuit 40 housed for example in the hollow interior of a fixing portion 60 of the handle 59. The electronic circuit 40 of the vessel is in connection with a lid position detector 43 configured and arranged for detecting if said lid 52 is in a closed position. In the illustrated embodiment, the mentioned lid position detector 43 comprises a reed switch arranged for being activated by a magnetic field generated by a permanent magnet 44 housed in the lid 52. Optionally, the electronic circuit 40 is also in connection with a temperature detector 46 configured and arranged for detecting a temperature in the vessel, for example a temperature in a region of the vessel wall 51. The electronic circuit 40 includes a signal emitter 45 configured for wirelessly emitting a signal representative of said lid position detection and/or of said temperature detection.

In one embodiment, the electronic circuit 40 of the cooking vessel 50 has stored information relating to the vessel (type, dimensions, calibration of the temperature sensor, manufacturer, year of manufacture, etc.), and the signal emitter 45, or other emitting means in connection with the electronic circuit 40, are configured for wirelessly emitting a signal representative of this information package together with the remaining information when the cooking vessel 50 is placed on the treatment area 4 of the support plate 2.

The electronic supply and control circuit 30 of the cooking hob 1 includes a signal receiver 35 configured and arranged for receiving said signal sent from the signal emitter 45 installed in the cooking vessel 50 through the support plate 2. The electronic supply and control circuit 30 is configured for enabling or disabling the operation of the rotary blade driving means 32, and/or of the position changing means 33 or shielding means 28, and/or of the heating means 34, and/or of the weighing means 38 according to the signal received from said signal emitter 45.

For example, the electronic supply and control circuit 30 will not allow the rotary blade driving means 32 to start operating to rotate the lower magnetic coupling member 5 or the position changing means 33 or the shielding means to put the lower magnetic coupling member 5 in the operative situation or the shielding means 28 to put the shield element 26 in the inactive position if the signal receiver 35 has not received a signal representative of the lid 52 being correctly closed in the cooking vessel 50, even though the user has given the order to start operating by means of a control panel 31 of the cooking hob 1.

In the illustrated embodiments, the cooking vessel 50 comprises a photovoltaic cell 41 exposed to light and connected for charging an energy storage device 42, such as a rechargeable battery or an ultracapacitor, for example, configured and arranged for supplying electric current to said electronic circuit 40 and to said detectors 43, 46. For example, the photovoltaic cell 41 is housed in a recess of the handle 59 and protected by a transparent cover 61.

In another alternative embodiment (not shown), the cooking hob 1 comprises an energy emitter installed below the support plate 2 and the cooking vessel 50 comprises an energy receiver configured and arranged for receiving energy wirelessly emitted by said energy emitter, for converting said energy received into electric current, and for supplying said electric current to said electronic circuit 40 and to said detectors 43, 46.

A person skilled in that art will envisage modifications and variations from the embodiments shown and described without departing from the scope of the present invention as it is defined in the attached claims.

The invention claimed is:

1. A cooking hob with rotary blade driving means, comprising:
   a continuous glass or glass ceramic support plate provided with a treatment area; and
   rotary blade driving means comprising a lower magnetic coupling member rotatably arranged in said treatment area below the support plate and a drive motor operatively connected for rotating said lower magnetic coupling member;
   the cooking hob including activation/deactivation means for substantially activating and deactivating the magnetic field exerted by the lower magnetic coupling member through the support plate, wherein said activation/deactivation means comprise:
   position changing means for moving the lower magnetic coupling member between an operative position, in which the lower magnetic coupling member is close enough to the support plate to magnetically transmit torque to an upper magnetic coupling member connected to rotary blades installed in a cooking vessel located on the treatment area of the support plate, and an inoperative position, in which the lower magnetic coupling member is far enough from the support plate so as to be free from transmitting said torque;
   wherein the support plate is supported on a base structure, and said position changing means comprise:
   a moving support on which the lower magnetic coupling member, said drive motor, and transmission means for transmitting movement from the drive motor to the lower magnetic coupling member are installed;
   spindles rotatably supported on the base structure and coupled to corresponding nuts fixed to said moving support; and
   a position changing motor operatively connected for rotating said spindles, thereby moving said moving support with respect to said base structure.

2. The cooking hob according to claim 1, characterized in that the support plate is supported on the base structure by weighing means including a weight transducer connected to the base structure and to the support plate.

3. The cooking hob according to claim 1, characterized in that the support plate is fixed to an intermediate support on which the lower magnetic coupling member is supported, and said intermediate support is supported on the base structure by weighing means including a weight transducer connected to the base structure and to the intermediate support.

4. The cooking hob according to claim 1, characterized in that the cooking hob comprises heating means located in relation to said treatment area below said support plate.

5. The cooking hob according to claim 4, characterized in that said heating means comprise an induction heating device arranged around the lower magnetic coupling member at a distance from the support plate and an electronic induction circuit for powering up said induction heating device.

6. The cooking hob according to claim 4, characterized in that the cooking hob comprises a control panel connected to an electronic supply and control circuit for controlling said rotary blade driving means and/or said position changing means and/or said heating means, and in that said electronic supply and control circuit includes a signal receiver configured and arranged for receiving a signal sent from a signal emitter installed in said cooking vessel, the electronic supply and control circuit being configured for enabling or disabling the operation of said rotary blade driving means and/or of said position changing means and/or of said heating means according to said signal received from said signal emitter.

7. The cooking hob according to claim 1, characterized in that each of the spindles has a cog pulley fixed thereto, and a cog belt is installed on said cog pulleys forcing the spindles to rotate in unison.

8. The cooking hob according to claim 1, characterized in that one of the spindles further has a gear wheel fixed thereto, said gear wheel meshing with a worm screw fixed to an output shaft of said position changing motor.

9. An assembly comprising a cooking hob with rotary blade driving means and cooking vessel with rotary blades, where said cooking hob comprises:
- a continuous glass or glass ceramic support plate provided with a treatment area; and
- rotary blade driving means comprising a lower magnetic coupling member rotatably arranged in said treatment area below the support plate and a drive motor operatively connected for rotating said lower magnetic coupling member, and where said cooking vessel comprises:
- a vessel wall with a bottom and an upper opening;
- a lid for closing said upper opening;
- rotary blades installed inside said vessel wall; and
- an upper magnetic coupling member connected to said rotary blades and arranged for facing and being located a short distance from an upper surface of said support plate when said cooking vessel is located thereon,
- the cooking hob including activation/deactivation means for substantially activating and deactivating the magnetic field exerted by the lower magnetic coupling member through the support plate, wherein said activation/deactivation means comprise:
- position changing means for moving the lower magnetic coupling member between an operative position, in which the lower magnetic coupling member is close enough to the support plate to magnetically transmit torque to an upper magnetic coupling member connected to rotary blades installed in a cooking vessel located on the treatment area of the support plate, and an inoperative position, in which the lower magnetic coupling member is far enough from the support plate so as to be free from transmitting said torque;
- wherein the support plate is supported on a base structure, and said position changing means comprise:
- a moving support on which the lower magnetic coupling member, said drive motor, and transmission means for transmitting movement from the drive motor to the lower magnetic coupling member are installed;
- spindles rotatably supported on the base structure and coupled to corresponding nuts fixed to said moving support; and
- a position changing motor operatively connected for rotating said spindles, thereby moving said moving support with respect to said base structure.

10. The assembly according to claim 9, characterized in that the cooking vessel comprises an electronic circuit in connection with a lid position detector configured and arranged for detecting if said lid is in a closed position, and in that said electronic circuit includes a signal emitter configured for wirelessly emitting a signal representative of said lid position detection, said signal being suitable for being received by a signal receiver located below the support plate.

11. The assembly according to claim 10, characterized in that the cooking vessel comprises a temperature detector configured and arranged for detecting a temperature in the cooking vessel, said temperature detector being in connection with said electronic circuit, and in that said signal emitter is configured for wirelessly emitting a signal representative of said temperature detection, said signal being suitable for being received by a signal receiver located below the support plate.

12. The assembly according to claim 11, characterized in that the cooking hob comprises a control panel connected to an electronic supply and control circuit for controlling said rotary blade driving means and/or said activation/deactivation means and/or heating means located in relation to said treatment area below said support plate, and in that said electronic supply and control circuit includes said signal receiver, which is configured and arranged for receiving said signal sent from said signal emitter, the electronic supply and control circuit being configured for enabling or disabling the operation of said rotary blade driving means and/or of said activation/deactivation means and/or of said heating means according to said signal received from said signal emitter.

13. The assembly according to claim 11, characterized in that the cooking hob comprises a wireless energy emitter installed below the support plate and the cooking vessel comprises a wireless energy receiver configured and arranged for receiving energy emitted by said wireless energy emitter, for converting said energy received into electric current, and for supplying said electric current to said electronic circuit and to said detectors.

14. The assembly according to claim 10, characterized in that the cooking hob comprises a control panel connected to an electronic supply and control circuit for controlling said rotary blade driving means and/or said activation/deactivation means and/or heating means located in relation to said treatment area below said support plate, and in that said electronic supply and control circuit includes said signal receiver, which is configured and arranged for receiving said signal sent from said signal emitter, the electronic supply and control circuit being configured for enabling or disabling the operation of said rotary blade driving means and/or of said activation/deactivation means and/or of said heating means according to said signal received from said signal emitter.

15. The assembly according to claim 10, characterized in that the cooking hob comprises a wireless energy emitter installed below the support plate and the cooking vessel comprises a wireless energy receiver configured and arranged for receiving energy emitted by said wireless energy emitter, for converting said energy received into electric current, and for supplying said electric current to said electronic circuit and to said detectors.

16. The cooking hob according to claim 9, characterized in that each of the spindles has a cog pulley fixed thereto, and a cog belt is installed on said cog pulleys forcing the spindles to rotate in unison.

17. The cooking hob according to claim 9, characterized in that one of the spindles further has a gear wheel fixed thereto, said gear wheel meshing with a worm screw fixed to an output shaft of said position changing motor.

* * * * *